United States Patent [19]

Rudelick

[11] Patent Number: 4,564,040

[45] Date of Patent: Jan. 14, 1986

[54] FAUCET AND LIQUID SUPPLY TUBE THEREFOR

[75] Inventor: John Rudelick, Milwaukee, Wis.

[73] Assignee: Milwaukee Faucets (Div. of Universal-Rundle Corporation), Milwaukee, Wis.

[21] Appl. No.: 460,566

[22] Filed: Jan. 24, 1983

[51] Int. Cl.[4] ............................................ F16K 51/00
[52] U.S. Cl. .................................. 137/454.6; 137/798; 251/143; 285/189
[58] Field of Search ............... 137/454.2, 454.5, 454.6, 137/625.4, 625.41, 607, 636.1, 636.2, 636.3, 636.4, 798; 285/140, 189, 222, 354; 251/142, 143, 147, 148

[56] References Cited

U.S. PATENT DOCUMENTS

| Re. 29,054 | 11/1976 | Lange . | |
|---|---|---|---|
| 1,017,813 | 2/1912 | Schuermann . | |
| 1,115,696 | 11/1914 | Linbarger . | |
| 1,202,787 | 10/1916 | Bradshaw . | |
| 1,384,989 | 7/1921 | Bray . | |
| 1,710,267 | 4/1929 | Mueller | 285/189 X |
| 2,091,553 | 8/1937 | Mallet . | |
| 2,468,315 | 4/1949 | Wagner | 285/189 X |
| 2,726,104 | 12/1955 | Boitnott | 285/354 X |
| 2,877,797 | 3/1959 | Jordan . | |
| 3,000,392 | 9/1961 | Young . | |
| 3,127,199 | 3/1964 | Roe . | |
| 3,144,048 | 8/1964 | Acker . | |
| 3,195,561 | 7/1965 | Sovitzky | 251/143 X |
| 3,337,181 | 8/1967 | Wennerstrom | 251/148 |
| 3,366,328 | 1/1968 | Feinberg . | |
| 3,411,628 | 11/1968 | Mason . | |
| 3,421,540 | 1/1969 | Fulton | 137/454.6 |
| 3,495,616 | 2/1970 | Esposito . | |
| 3,512,547 | 5/1970 | Gibbs . | |
| 3,559,690 | 2/1971 | Palmer . | |
| 4,005,728 | 2/1977 | Thorp | 137/454.6 X |
| 4,054,157 | 10/1977 | Moseley, Jr. . | |
| 4,074,697 | 2/1978 | Saether . | |
| 4,108,208 | 8/1978 | von Corpon . | |
| 4,185,659 | 1/1980 | Bernat | 137/454.6 X |
| 4,226,260 | 10/1980 | Schmitt | 137/454.6 X |
| 4,262,699 | 4/1981 | Fabian . | |

FOREIGN PATENT DOCUMENTS 2627501 12/1976 Fed. Rep. of Germany ...... 251/148

Primary Examiner—Robert G. Nilson
Attorney, Agent, or Firm—Wood, Dalton, Phillips, Mason & Rowe

[57] ABSTRACT

A faucet and liquid supply tube therefor. The faucet includes a body portion defining a valve chamber having a discharge opening communicating with a spout together with an inlet opening adapted to communicate with a liquid supply line. It also includes a control valve received in the valve chamber and having an inlet passage communicating with the inlet opening together with a discharge port communicating with the discharge opening. The liquid supply tube has an area of increased wall thickness defining an enlarged head terminating in a shoulder at the end thereof associated with the inlet opening together with a substantially uniform inner diameter for carrying liquid from the supply line into the inlet passage. In addition, a seal is associated with the enlarged head externally of the liquid supply tube.

13 Claims, 7 Drawing Figures

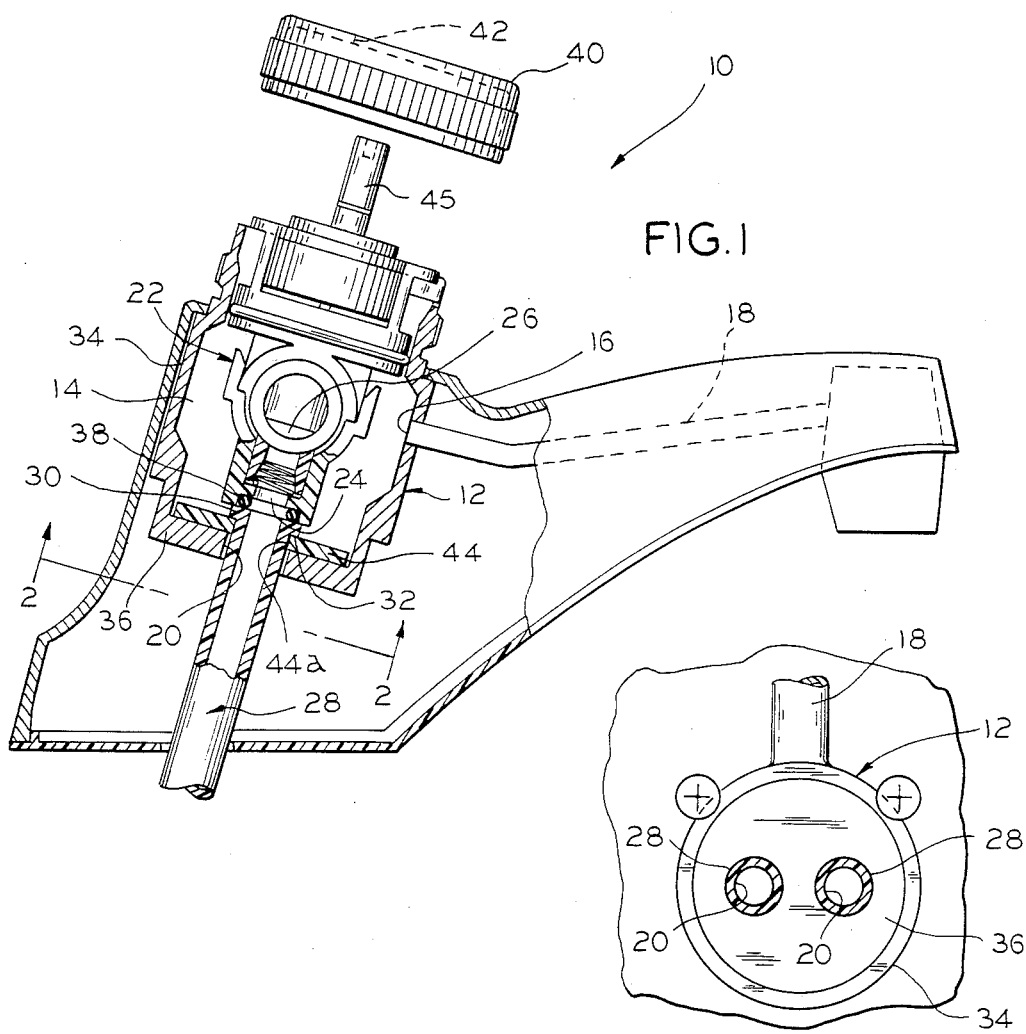
FIG.1
FIG.2
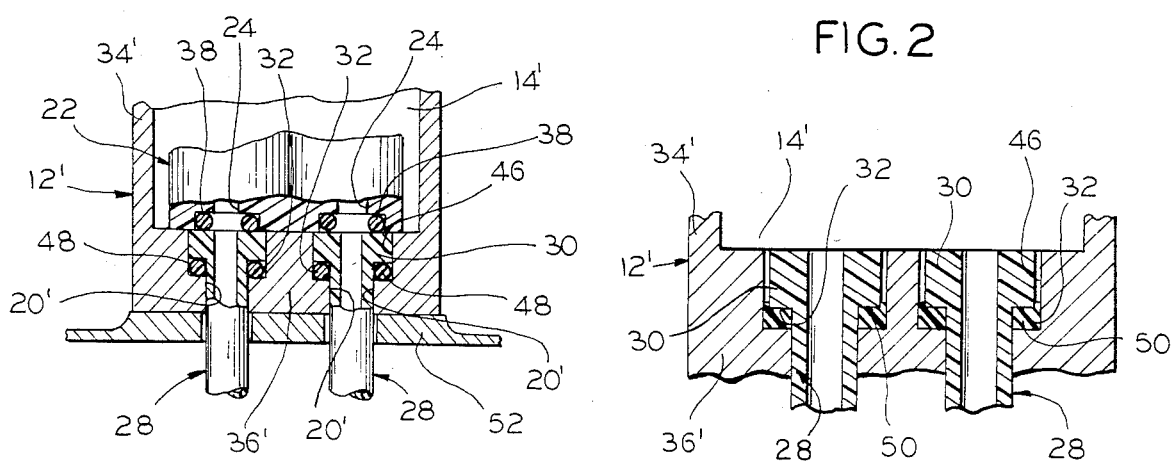
FIG.3
FIG.4

FAUCET AND LIQUID SUPPLY TUBE THEREFOR

BACKGROUND OF THE INVENTION

The present invention is directed to a faucet and liquid supply tube therefor and, more particularly, to a faucet utilizing a liquid supply tube having an enlarged head.

In placing a faucet in service on a sink, it has been inconvenient and difficult to make connections from the liquid supply lines to the faucet inlet openings. The problem is compounded by the sink bowl or tub and the usual narrow space left behind the back surface of the sink bowl or tub and the supporting wall for the sink. As will be appreciated, the narrow space has not only been inconvenient and difficult to work in but has commonly required special tools for connecting the liquid supply lines to the faucet inlet openings.

In addition, the faucet connections which have been commonly utilized are not conducive to the growing do-it-yourself market. The need for special tools together with the problem of accessibility to the location where connections must be made has discouraged all but the most determined from removing and installing faucets without the aid of a plumber. Moreover, even when an installation is attempted, more often than not the result is a leaky connection.

While there have been attempts to overcome these problems, the results have usually not been satisfactory. The quality of the materials and the design of the faucets and fittings have either discouraged the do-it-yourselfer or have resulted in immediate or potential latent problems not associated with conventional plumbing connections and fittings that have been properly installed by a plumber. In view of this, it has remained to provide a faucet and liquid supply tube therefor capable of overcoming the aforementioned problems.

SUMMARY OF THE INVENTION

The present invention is directed to a faucet and liquid supply tube therefor. The faucet includes a body portion defining a valve chamber having a discharge opening communicating with a spout together with an inlet opening adapted to communicate with a liquid supply line. It also includes a control valve received in the valve chamber and having an inlet passage communicating with the inlet opening together with a discharge port communicating with the discharge opening. The liquid supply tube has an area of increased wall thickness defining an enlarged head terminating in a shoulder at one end together with a substantially uniform inner diameter. Additionally, a seal is associated with the enlarged head externally of the liquid supply tube.

In a preferred embodiment, the body portion includes a generally cylindrical wall terminating in a closed end having a bore defining the inlet opening. The liquid supply tube is then adapted to be inserted through the bore in the closed end until the shoulder of the liquid supply tube is resting about the bore in the closed end on the side facing the valve chamber defined by the generally cylindrical wall. With this arrangement, the control valve is adapted to be inserted into the valve chamber after insertion of the liquid supply tube.

Preferably, the seal is disposed between the top of the enlarged head of the liquid supply tube and the bottom of the control valve. A threaded cap adapted to be secured to the wall of the body portion may then be provided to form a closed top, the cap having an opening for receiving a stem of the control valve directly opposite the closed end. During assembly, the threaded cap may be tightened to cause the control valve to force the seal into sealing engagement with the enlarged head of the liquid supply tube.

Considering the preferred embodiment in greater detail, the seal advantageously surrounds the inlet passage in the control valve. The inlet passage may then be disposed substantially concentrically with respect to the liquid supply tube. Moreover, the inlet passage advantageously has a diameter substantially the same as the inner diameter of the liquid supply tube.

Alternatively, an additional seal may be disposed between the shoulder of the liquid supply tube and the side of the closed end facing the valve chamber. When this seal is used, the threaded cap causes the control valve to force the shoulder of the liquid supply tube into sealing engagement therewith.

In another embodiment, the closed end of the body portion may include a counterbore adapted to receive the enlarged head of the liquid supply tube. The counterbore may be in the closed end on the side facing the valve chamber in which case a first seal may be disposed between the shoulder of the liquid supply tube and the bottom of the counterbore and a second seal may be disposed between the bottom of the control valve and the enlarged head of the liquid supply tube with means such as a threaded cap being provided to maintain sealing engagement therebetween. As before, the threaded cap is preferably adapted to be secured to the wall of the body portion to form a closed top directly opposite the closed end.

In still another embodiment, the closed end may include a counterbore adapted to receive the enlarged head of the liquid supply tube on the side facing away from the valve chamber. In this embodiment, a base plate or escutcheon having a bore of substantially the same diameter as the bore in the closed end of the body portion is provided such that the bore in the base plate is substantially concentric with the bore and counterbore in the closed end of the body portion. As will be appreciated, the base plate is then joined to the closed end of the body portion on the side facing away from the valve chamber.

In this embodiment, the liquid supply tube is adapted to be inserted through the bore in the plate until its shoulder is resting about the bore in the base plate on the side facing the closed end. The enlarged head of the liquid supply tube is then adapted to be inserted into the counterbore in the closed end as the base plate is being joined to the body portion. Additionally, the seal may be disposed so as to be in sealing engagement between the top of the counterbore and the top of the enlarged head after assembly.

With the features of the invention, a liquid supply tube for a faucet having an inlet adapted to communicate with a liquid supply line may be provided. The invention comprises a section of tubing of a length for connecting the supply line to the faucet wherein the tubing section is adapted to have one end joined to the faucet in communication with the inlet and is adapted to have the other end joined to the supply line. The invention contemplates the section of tubing having an area of increased wall thickness at the end adapted to be joined to the faucet wherein the area of increased wall thickness defines an enlarged head terminating in a shoulder. Moreover, the liquid supply tube is characterized by the tubing section having a substantially uniform inner diameter for carrying liquid from the supply line to the faucet.

These and other features of the invention will be more fully appreciated from the detailed description which follows when taken in conjunction with the accompanying drawings.

BRIEF DESCRIPTION OF THE DRAWINGS

In the drawings:

FIG. 1 is a side elevational view, partially in section, illustration a faucet and liquid supply tube therefor;

FIG. 2 is a cross-sectional view taken on the line 2—2 of FIG. 1;

FIG. 3 is a cross-sectional view illustrating an alternative embodiment of the faucet and liquid supply tube therefor;

FIG. 4 is a cross-sectional view illustrating another alternative embodiment of the faucet and liquid supply tube therefor;

DETAILED DESCRIPTION OF THE PREFERRED EMBODIMENTS

Figure 5:
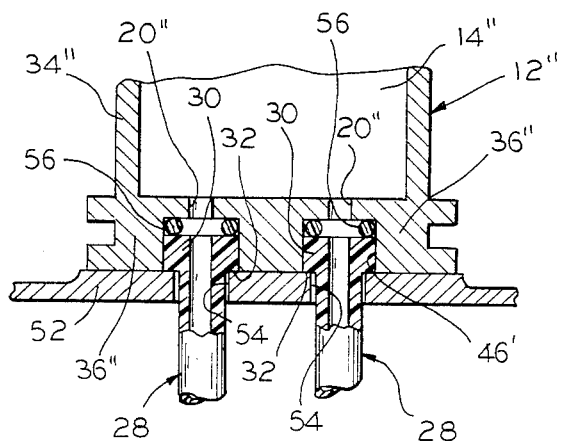
FIG. 5 is a cross-sectional view illustrating still another alternative embodiment of the faucet and liquid supply tube therefor.

In the illustration given, and with reference first to FIG. 1, the reference numeral 10 designates generally a faucet in accordance with the present invention. The faucet 10 includes a body portion 12 defining a valve chamber 14 having a discharge opening 16 communicating with a spout 18 together with an inlet opening 20 adapted to communicate with a liquid supply line (not shown). It also includes a control valve 22 received in the valve chamber 14 and having an inlet passage 24 communicating with the inlet opening 20 together with a discharge port 26 communicating with the discharge opening 16. The faucet 10 further includes a liquid supply tube 28 having an area of increased wall thickness defining an enlarged head 30 terminating in a shoulder 32 at the end associated with the inlet opening 20 together with a substantially uniform inner diameter for carrying liquid from the supply line into the inlet passage 24. In addition, seal means is associated with the enlarged head 30 externally of the liquid supply tube 28, as will be described in detail hereinafter.

Still referring to FIG. 1, the body portion 12 includes a generally cylindrical wall 34 terminating in a closed end 36 having a bore defining the inlet opening 20. The liquid supply tube 28 is adapted to be inserted through the bore 20 until the shoulder 32 of the liquid supply tube 28 is resting about the bore 20 on the side of the closed end 36 facing the valve chamber 14. The control valve 22 is adapted to be inserted into the valve chamber 14 following insertion of the liquid supply tube 28 with seal means, such as seal 38, being disposed between the top of the enlarged head 30 and the bottom of the control valve 22. In addition, a threaded cap 40 adapted to be secured to the wall 34 of the body portion 12 (the threaded cap 40 being shown removed in FIG. 1) forms a closed top having an opening 42 for receiving a stem 44 of the control valve 22 directly opposite the closed end 36.

As shown, the liquid supply tube 28, the seal 38, the control valve 22 and the threaded cap 40 are arranged such that tightening the threaded cap 40 causes the control valve 22 to force the seal 38 into sealing engagement with the enlarged head 30 of the liquid supply tube 38. Moreover, the seal 38 surrounds the inlet passage 24 in the control valve 22 with the inlet passage 24 preferably being disposed substantially conentrically with and having a diameter substantially the same as the inner diameter of the liquid supply tube 28.

Optionally, the faucet 10 may include additional seal means, such as the seal 44, disposed between the shoulder 32 and the side of the closed end 36 facing the valve chamber 14. The seal 44 advantageously substantially covers the side of the closed end 36 facing the valve chamber 14 and has a bore positioned so as to be substantially concentric with and of substantially the same diameter as the inlet opening 20. By tightening the threaded cap 40, with is preferably designed to be adequately tightened by hand, the control valve 22 forces the shoulder 32 into sealing engagement with the seal 44.

In an alternative embodiment, the closed end 36' includes a counterbore 46 adapted to receive the enlarged head 30 of the liquid supply tube 28 (see FIG. 3). The counterbore 46 in this embodiment is in the closed end 36' on the side thereof facing the valve chamber 14' and the seal means includes a first seal 48 such as an O-ring disposed between the shoulder 32 of the liquid supply tube 28 and the bottom of the counterbore 46 as well as a second seal 38 such as an O-ring disposed between the bottom of the control valve 22 and the enlarged head 30 of the liquid supply tube 28. Also, the alternative embodiment illustrated in FIG. 3 includes means for maintaining sealing engagement therebetween.

Preferably, the means for maintaining sealing engagement in the FIG. 3 embodiment is a threaded cap (not shown). The threaded cap, which is preferably the same as that illustrated in FIG. 1, is adapted to be secured to the wall 34' of the body portion 12' to form a closed top. Again, the closed top will have an opening for receiving a stem of the control valve as illustrated in FIG. 1.

Referring to FIG. 4, another alternative embodiment is shown in an enlarged cross-sectional illustration differing only slightly from the embodiment of FIG. 3. In fact, this embodiment is identical to the embodiment illustrated in FIG. 3 with the exception of one of the seals. As shown, the seal 50 is generally square in cross-section in contrast to the seal 48 illustrated as being circular in cross-section in FIG. 3.

Referring now to FIG. 5, still another alternative embodiment is illustrated. The closed end 36" includes a counterbore 46' adapted to receive the enlarged head 30 of the liquid supply tube 28. The counterbore 46' in this embodiment is in the closed end 36" on the side facing away from the valve chamber 14" and a base plate or escutcheon 52 is provided having a bore 54 of substantially the same diameter as the outer diameter of the liquid supply tube 28. The base plate 52 is formed so that the bore 54 is substantially concentric with the bore 20" and counterbore 46' in the closed end 36". In addition, the base plate 52 is joined to the closed end 36" on the side facing away from the valve chamber 14".

As can be seen from FIG. 5, the liquid supply tube 28 is adapted to be inserted through the bore 54 in the base plate 52 until the shoulder 32 is resting about the bore 54 in the base plate 54 on the side facing the closed end 36". The enlarged head 30 of the liquid supply tube 28 is then adapted to be inserted into the counterbore 46' in the closed end 36" as the base plate 52 is being joined to the body portion 12". As shown, a seal 56 is disposed so as to be in sealing engagement between the top of the counterbore 46' and the top of the enlarged head 30 after assembly.

Figure 6:
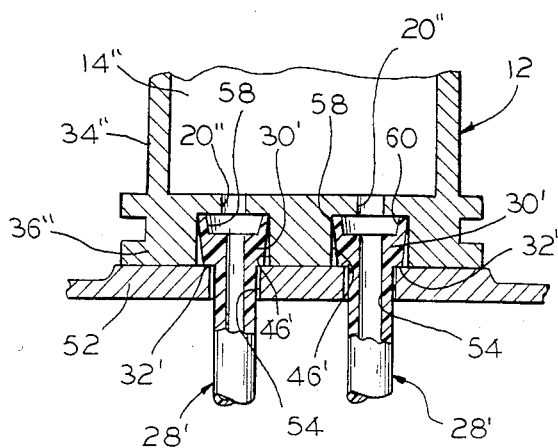
FIG. 6 is a cross-sectional view illustrating a further alternative embodiment of the faucet and liquid supply tube therefor.

A further alternative embodiment is contemplated which utilizes a different liquid supply tube (see FIG. 6). In this embodiment, the enlarged head 30' of the liquid supply tube 28' includes a tapered outer wall 58 terminating opposite the shoulder 32' in an inverted frustoconical thin walled portion 60 having a maximum diameter greater than the diameter of the counterbore 46'. Accordingly, the thin walled portion 60 has a sealing interference fit with the counterbore 46'.

As will be appreciated by referring to FIG. 2, the faucet 10 illustrated in FIG. 1 is of the single lever type (with the handle or lever not shown). The body portion 12 therefore will have a pair of inlet openings 20 each of which is adapted to communicate with one of a pair of liquid supply lines, e.g., a hot water supply line and a cold water supply line. Moreover, the control valve 22 will have a pair of inlet passages 24 (see, e.g., FIG. 3), each of which communicates with one of the pair of inlet openings 20.

With a single lever faucet, a pair of liquid supply tubes 28 are utilized with each being adapted to have one end associated with one of the inlet openings 20 and the other end associated with one of the liquid supply lines (not shown). Referring to FIG. 3, it will be appreciated that the respective liquid supply tubes 28, seals 38, and seals 48 are preferably identical and the respective liquid supply tubes 28 and seals 38 illustrated in the FIG. 1 embodiment are likewise identical to one another and to the liquid supply tubes 28 and seals 38 in the embodiment of FIG. 3. However, as will be appreciated, the seal 44 utilized in the FIG. 1 embodiment will have a pair of bores (such as 44a) registering with the inlet openings 20 through which the liquid supply tubes 28 can be inserted.

Referring to FIGS. 5 and 6, the body portions 12" are identical in every respect. They both include a generally cylindrical wall portion 34" terminating in a closed end 36" having bores defining a pair of inlet openings 20", and both body portions 12" also include a pair of counterbores 46' adapted to receive the enlarged heads 30 and 30', respectively, of a pair of liquid supply tubes 28 and 28', respectively. In addition, FIGS. 5 and 6 embodiments both utilize a base plate or escutcheon 53 as do the embodiments in FIGS. 3 and 4.

Figure 7:
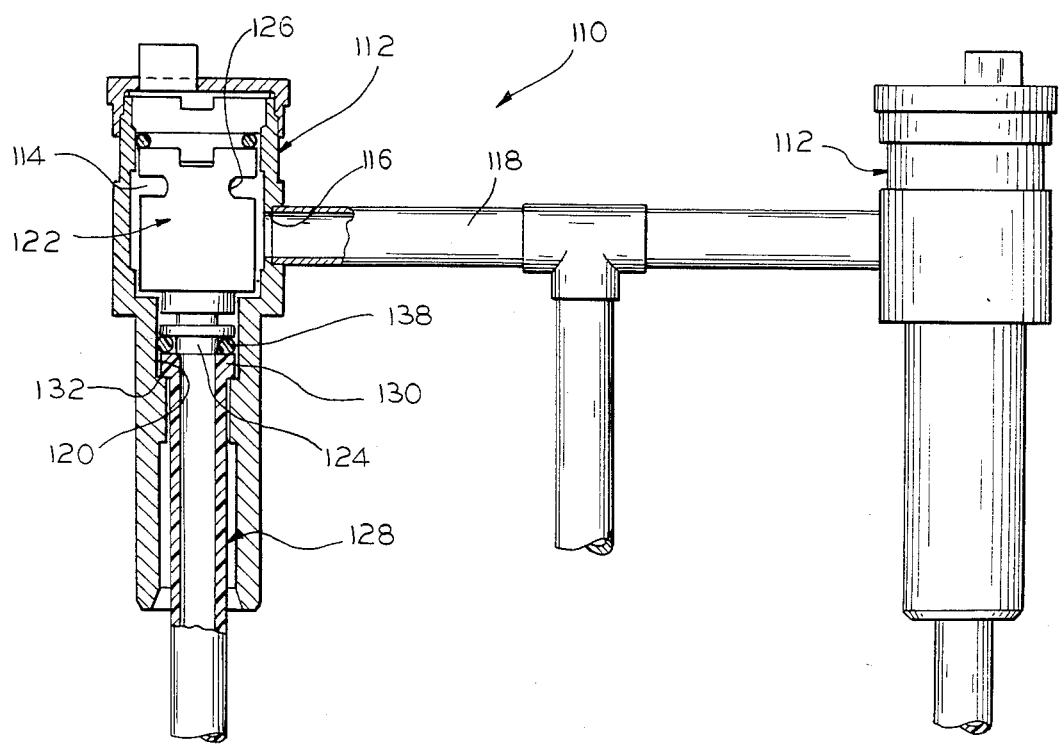
FIG. 7 is a front elevational view, partially in section, illustrating yet another alternative embodiment of the faucet and liquid supply tube therefor.

Finally, referring to FIG. 7, still another alternative embodiment is illustrated in which the invention is used with a two handle faucet 110. This embodiment contemplates a body portion 112 defining a valve chamber 114 having a discharge opening 116 communicating with a spout 118 together with an inlet opening 120 adapted to communicate with a liquid supply line (not shown), a control valve 122 being disposed in the valve chamber 114 and having an inlet passage 124 communicating with the inlet opening 120 and with a discharge port 126 communicating with the discharge opening 116. As will be appreciated, the two handle faucet 110 also includes the use of a liquid supply tube 128 in accordance with the teachings of the present invention.

Still referring to FIG. 7, the liquid supply tube 128 is adapted to have one end associated with the inlet opening 120 and the other end associated with a liquid supply line. The liquid supply tube 128 also has an area of increased wall thickness defining an enlarged head 130 terminating in a shoulder 132 at the end thereof associated with the inlet opening 120. Moreover, the liquid supply tube 128 preferably has a substantially uniform inner diameter for carrying liquid from the supply line, through the inlet opening, and into the inlet passage.

Also as shown, the two handle faucet 110 includes seal means, such as the seal 138, associated with the enlarged head 130 externally of the liquid supply tube 128.

While not shown, it will be appreciated that both body portions 112 of the two handle faucet 110 are preferably identical. It will also be appreciated that many variations in construction such as those described in detail in connection with a single lever faucet may also be utilized with the faucet 110. In fact, the present invention may be successfully utilized with nearly any faucet construction, as will now be apparent to those skilled in the art.

With the present invention, a liquid supply tube has been provided for a faucet having an inlet adapted to communicate with a liquid supply line. The liquid supply tube includes a section of tubing of a length for connecting the supply line to the faucet with the tubing section being adapted to have one end joined to the faucet in communication with the inlet and being adapted to have the other end joined to the supply line, the tubing section having an area of increased wall thickness at the end thereof adapted to be joined to the faucet such that the area of increased wall thickness defines an enlarged head terminating in a shoulder. Moreover, the liquid supply tube is preferably constructed so that the tubing section has a substantially uniform inner diameter for carrying liquid from the supply line to the faucet.

With this construction, the tubing section is adapted to be inserted through the inlet until its shoulder is resting about the inlet within the faucet. It is then contemplated that seal means adapted to be disposed externally of the tubing section between the enlarged head of the tubing section and the faucet will be provided, or additionally, seal means preferably being disposed on the top of the enlarged head in sealing engagement therewith. Optionally, or additionally, the seal means is adapted to be disposed under the shoulder of the tubing section in sealing engagement therewith.

In a preferred embodiment, the liquid supply line is formed of a flexible non-metallic material such as polybutylene. Among the advantages of the liquid supply tube is the fact that the tube is in direct communication with the control valve or cartridge so that there are no seals or springs in the water passage and, due to the fact that the tube can be inserted through the faucet from the top rather than having to be connected to the faucet from under the sink, and because installation requires no tools, it is especially adapted for the do-it-yourself market where the average consumer would have neither the tools nor the ability to make watertight connections in the confined space under a sink. Moreover, because of the enlarged head, the end of the liquid supply tube attached to the faucet is extremely strong.

While not forming a part of the present invention, it will be appreciated that the liquid supply tubes may be connected to the liquid supply lines in any of a number of ways. This can be accomplished, for instance, with conventional compression fittings and, since the liquid supply tubes are flexible and can be cut to length, the connections can be made well under the sink at a point of easy access. Moreover, because of the enlarged head, which may be thermoformed, it is virtually impossible for the liquid supply tube to pull through the faucet.

With the present invention, the faucet is easy to install and the liquid supply tubes are inexpensive to manufacture. Moreover, the construction is such that the seals are radially confined in every instance (see, for instance, the depending circumferential flange on the control valve radially retaining the seal in FIG. 1) and, as a result, there is almost no chance for the seal to spread causing the faucet to leak after installation. Clearly, the faucet and liquid supply tube therefor represents a significant advancement in the art.

The embodiments illustrated herein are presently preferred, and are believed to constitute the best mode for practicing the invention. But various other structures may also fall within the teachings of this disclosure. Therefore, the illustrated embodiments are to be considered merely exemplary with the scope of protection afforded this invention being defined only by the appended claims.

I claim:

1. A faucet, comprising:
   a body portion defining a valve chamber, said valve chamber having a discharge opening communicating with a spout, said body portion including a generally cylindrical wall terminating in a closed end having a bore defining an inlet opening;
   a control valve received in said valve chamber, said control valve having an inlet passage communicating with said inlet opening, said control valve having a discharge port communicating with said discharge opening;
   a flexible non-metallic liquid supply tube adapted to have one end associated with said inlet opening, said liquid supply tube having an area of increased wall thickness defining an enlarged head terminating in a shoulder at the end associated with said inlet opening, said liquid supply tube having a substantially uniform inner diameter for carrying liquid through said inlet opening and into said inlet passage, said liquid supply tube being adapted to be inserted through said bore in said closed end until said shoulder of said liquid supply tube is resting about said bore in said closed end on the side facing said valve chamber;
   seal means associated with said enlarged head externally of said liquid supply tube;
   means for radially confining said seal means to prevent spreading of said seal means and leakage; and
   a threaded cap adapted to be secured to said wall of said body portion to form a closed top having an opening for receiving a stem of said control valve directly opposite said closed end;
   said control valve being adapted to be inserted into said valve chamber without tools after insertion of said liquid supply tube, said seal means being disposed between the top of said enlarged head and the bottom of said control valve and coaxial with said inlet passage in said control valve, said inlet passage being disposed substantially coaxial with respect to said liquid supply tube and having a diameter substantially the same as the inner diameter of said liquid supply tube, said liquid supply tube, seal means, control valve and threaded cap being arranged such that said threaded cap can be tightened without tools to cause said control valve to force said seal means into radially confined sealing engagement with said enlarged head of said liquid supply tube.

2. The faucet as defined by claim 1 including additional seal means disposed between said shoulder of said flexible non-metallic liquid supply tube and the side of said closed end facing said valve chamber, and including means for radially confining said additional seal means to prevent said additional seal means from spreading and leaking, said liquid supply tube, seal means, closed end, additional seal means, control valve and threaded cap being arranged such that said threaded cap can be tightened without tools to cause said control valve to force said shoulder of said liquid supply tube into sealing engagement with said additional seal means.

3. The faucet as defined by claim 1 wherein said closed end includes a counterbore adapted to receive said enlarged head of said liquid supply tube, said counterbore being in said closed end on the side facing said valve chamber.

4. The faucet as defined in claim 3 wherein said seal means includes a faucet seal disposed between said shoulder of said liquid supply tube and the bottom of said counterbore and a second seal disposed between the bottom of said control valve and said enlarged head of said liquid supply tube together with means for maintaining sealing engagement therebetween.

5. The faucet as defined by claim 4 wherein said means for maintaining sealing engagement is said threaded cap.

6. The faucet as defined by claim 1 wherein said closed end includes a counterbore adapted to receive said enlarged head of said liquid supply tube, said counterbore being in said closed end of the side facing away from said valve chamber.

7. The faucet as defined by claim 6 including a base plate having a bore of substantially the same diameter as said bore in said closed end, said bore in said base plate being substantially concentric with said bore and said counterbore in said closed end, said base plate being joined to said closed end on the side facing away from said valve chamber.

8. The faucet as defined by claim 7 wherein said liquid supply tube is adapted to be inserted through said bore in said base plate until said shoulder of said liquid supply tube is resting about said bore in said base plate on the side facing said closed end.

9. The faucet as defined by claim 8 wherein said enlarged head of said liquid supply tube is adapted to be inserted into said counterbore in said closed end, after insertion of said liquid supply tube through said bore in said base plate, when said base plate is being joined to said closed end on the side facing away from said valve chamber.

10. The faucet as defined in claim 9 wherein said seal means is disposed in sealing engagement between the top of said counterbore in said closed end and the top of said enlarged head of said liquid supply tube when said base plate is joined to said closed end on the side facing away from said valve chamber.

11. The faucet as defined by claim 9 wherein said enlarged head of said liquid supply tube includes a tapered outer wall terminating opposite said shoulder in an inverted frustoconical thin walled portion, said thin walled portion having a maximum diameter greater than the diameter of said counterbore in said closed end so as to have an interference fit therewith.

12. The faucet as defined by claim 1 wherein said seal means includes a generally cylindrical seal having a bore therein, said bore registering with said inlet opening.

13. The faucet as defined by claim 12 wherein said liquid supply tube is adapted to be inserted through said bore in said closed end until said shoulder of said liquid supply tube is resting about said bore in said seal on the side facing said valve chamber.

* * * * *